Dec. 19, 1944.   C. CRISWELL   2,365,394
CRANKSHAFT
Filed Oct. 16, 1943
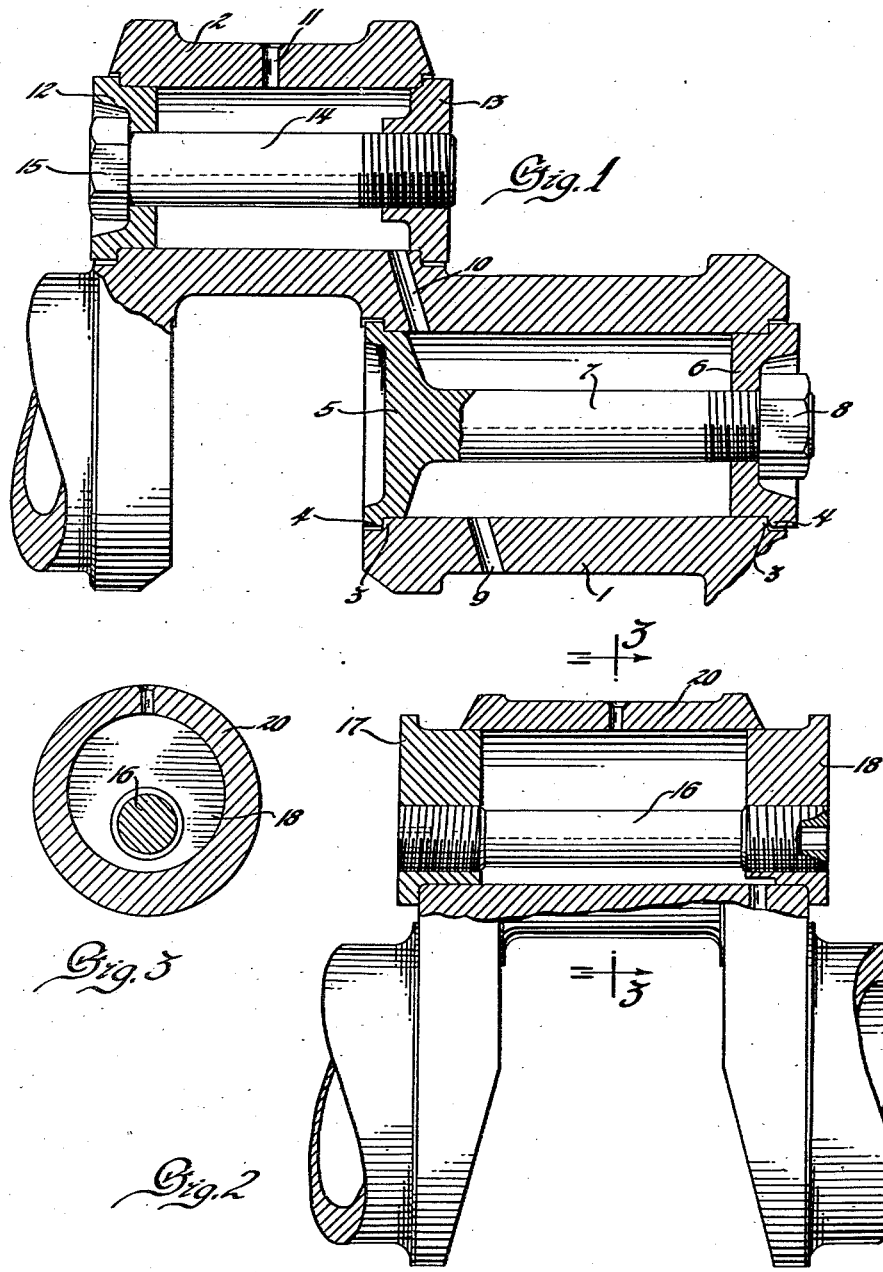
Inventor
Carmer Criswell
By Blackmore, Spencer + Flint
Attorneys Patented Dec. 19, 1944

2,365,394

UNITED STATES PATENT OFFICE 2,365,394

CRANKSHAFT

Carmer Criswell, Detroit, Mich., assignor to General Motors Corporation, Detroit, Mich., a corporation of Delaware Application October 16, 1943, Serial No. 506,483

7 Claims. (Cl. 74—596)

Pre-compressing the surface material in the fillets and in the crankpin and the journal of a crankshaft increases the fatigue resistance of the shaft to both torsional and bending vibration stresses. Shot blasting the surface and nitriding the surface have been tried and both pre-compress only a very thin surface layer of the material. It has been determined that more satisfactory results can be achieved if the pre-compression is more than superficial and an object of the present invention is to provide mechanical means for pre-compressing not just the surface but more or all of the metal in the zones subject to repetitive stress.

More particularly the invention contemplates the use of a pair of pressure distributing seats to engage opposite ends of a hollow bearing of the crankshaft journal and crankpin and to be joined by a tensionable tie member extending through the hollow bearing and which when properly tensioned exerts an inward pull on the seats for maintaining between them a pre-compression stress in the bearing metal. Pre-compression of the crankshaft metal necessitates the use of a tie bolt whose resistance to tension exceeds the compression resistance of the crankshaft. Accordingly it is proposed to form the bolt of a heat treated alloy steel in order that bolt tension can be run up to a high value and introduce a large amount of pre-compression in the surrounding crankpin or journal. By properly proportioning the cross sectional area of the bolt and the crankpin or the journal any predetermined degree of compression within practical limits can be obtained for a given bolt tension.

The invention will be better understood upon inspection of the accompanying drawing wherein Figure 1 shows a fragment of a crankshaft in section, having devices for applying pre-compression thereto; Figure 2 is a sectional view illustrating a form of device especially adapted for the crank throw, and Figure 3 is a transverse section on line 3—3 of Figure 2.

In Figure 1 the portion of the crankshaft illustrated includes a hollow main bearing journal 1 and a hollow crank or throw bearing 2. The side faces at opposite ends of the hollow bearing 1 are provided with inset shouldered seats 3—3 to which are fitted annular flanges 4 of end closure or pressure distributing heads 5 and 6 closely fitted to the interior bore of the hollow bearing. In this instance the head 5 is integral with one end of a tensionable rod or bolt 7, whose opposite end extends through the head 6 and is screw threaded to receive a retaining nut 8. Obviously the tightening of the nut 8 will place the shank of the bolt 7 under tension and draw the two heads 5 and 6 together to compress between them the metal of the journal 1. To effect proper pre-compression the bolt must be strong enough to resist the tension stress greater than the compression resistance of the crankshaft journal and a tension bolt formed of a suitable heat treated alloy steel is, therefore, contemplated.

The closely fitted heads distribute the pressure throughout their circumference and also seal the hollow bore to insure flow of lubricating oil from the main bearing to the crankpin bearing. For this purpose the main journal has the usual inlet port 9 leading into the journal bore from its outer bearing surface area with a port 10 communicating the journal bore with the bore of the hollow crankpin 2 from which leads an outlet port 11 to the usual connecting rod bearing surface.

Instead of the tensionable bolt having an integral head to seat directly on the end of the bearing as heretofore described the bolt may be of such character as to engage separate seating members indicated at 12 and 13. In this case the pressure transmitting head 12 fitted to the recessed end shoulder of the bearing 2 is also fitted to the headed bolt 14 and is retained by the hexagonal head 15 on one end of the bolt while the other end of the bolt is threaded directly into the other head 13. Relative rotation of the bolt and head 13 will place the bolt under tension and pull the heads 12 and 13 inwardly to hold the metal of the bearing, including the fillets under pre-compression.

Optionally both heads may be threaded on opposite ends of the tensionable bolt or rod as seen in Figure 2. Here the opposite ends of the bolt or tie rod 16 has screw threads of opposite hand engaged by the end closure heads 17 and 18. Spaced openings are formed in one or both ends of the bolt 16 to receive a pin wrench for rotating the bolt relatively to the heads 17 and 18. This construction is especially devised for enabling the axis of the tie pin to be offset from the axis of the crank toward the axis of crankshaft rotation in order that the compression stress may be more nearly concentrated in the region connecting the main journal 19 with the throw 20 and which connecting region is the place where the need for utmost strength is greatest.

I claim:

1. In a crankshaft having a hollow bearing portion, seating faces at opposite sides of the hollow bearing portion, pressure exerting heads fitted to said seating faces and a tensionable bolt extending axially through the hollow bearing portion to connect said heads and exerting sufficient pull on the heads to pre-compress the metal of the bearing portion a sufficiently large amount to increase the fatigue resistance thereof.

2. The method of pre-compressing the metal in a hollow bearing portion of a crankshaft or the like for increasing the fatigue resistance of the metal thereof, comprising inserting a tensionable bolt axially through the hollow bearing portion to seat pressure distributing heads at opposite ends thereof on the opposite ends of said bearing portion and then placing the bolt under considerable tension sufficient to hold the surrounding metal under a large amount of compression stress.

3. In a crankshaft, means to impart initial compression stress in the crankpin and journal as well as in the adjoining fillets, including tensionable bolts of heat treated alloy steel extending axially of the pin and journal, respectively, and a pair of axially spaced seating members carried by each bolt and engaged with the crankshaft to hold adjacent portions thereof pre-compressed incident to bolt tension, each of said bolts being more resistant to tension stress than the compression resistance of the pre-compressed shaft portions.

4. In a crankshaft having a hollow bearing, a pair of pressure distributing heads seated against axially spaced portions of said bearing and a tensionable bolt extending axially through the hollow bearing and having at one end an enlarged head in retaining engagement with one of said pressure distributing heads and a screw threaded engagement at its opposite end with the other of said heads, said bolt being of greater resistance to tension than the bearing is resistant to compression and being engaged with said pressure distributing heads under sufficient tension to impart a large amount of pre-compression to said crankshaft bearing.

5. In a crankshaft having a hollow bearing, a pair of pressure distributing heads seated against axially spaced portions of said bearing and a tensionable bolt extending axially through the hollow bearing and having at one end a nut threaded thereon in retaining engagement with one of said heads and being integral at its opposite end with the other head, said bolt being of greater tensionable resistance than the compression resistance of said bearing and being of such tension as to place the bearing under compression.

6. A rotatable crankshaft having a hollow throw, a pair of pressure distributing heads engaging opposite ends of the throw, a tie rod extending axially through the hollow throw in off center relation to the axis thereof and offset toward the axis of crankshaft rotation, screw thread formations on opposite ends of the rod engaging said heads and of opposite hand of threading to draw the heads together upon rod rotation, the tension resistance of the rod exceeding initial compression resistance of the throw and the rod being under such tension as to pre-compress said throw.

7. In a crankshaft having a pair of axially spaced trunnions and a crankpin integrally joined with both trunnions, pressure distributing heads seated on opposite ends of the pin and a tensionable rod connecting said heads and offset from the pin axis radially toward the axis of said trunnions, said rod and heads being so constructed and arranged in relation to the pin as to concentrate precompression stress on the crankpin in the regions of its jointure with said trunnions.

CARMER CRISWELL.